Patented Aug. 4, 1936

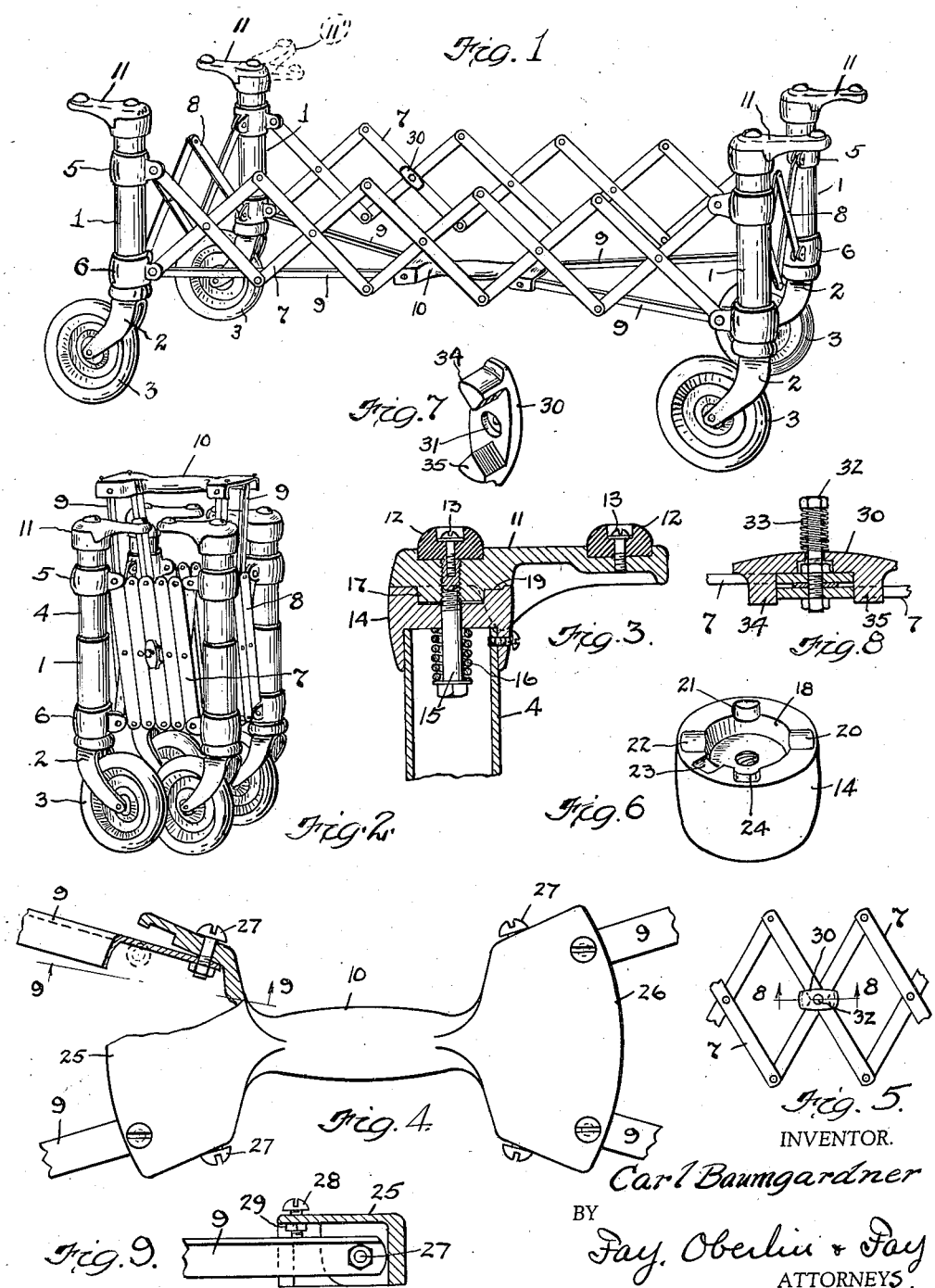

2,049,683

UNITED STATES PATENT OFFICE 2,049,683

CASKET TRUCK

Carl Baumgardner, Lakewood, Ohio

Application March 23, 1933, Serial No. 662,223

1 Claim. (Cl. 280—36)

The present invention, relating, as indicated, to a casket truck, or as alternatively called in the trade a "church truck", has reference to a wheeled accessory adapted for use by undertakers and funereal directors. Such a vehicle is used for the purpose of supporting caskets which it is well known are of various sizes, weights and dimensions. It is therefore one of the objects of my present invention and a fundamental requisite of its preferred embodiment that my casket truck be so constructed as to accommodate a great number of sizes of caskets as well as to possess strength and rigidity. Furthermore, inasmuch as such a casket truck must be quickly moved about from place to place, stored and transported in relatively small spaces such as in a hearse, it is also necessary that the device be made light in weight and of such a nature as to be compactly and conveniently collapsed. Hence the various component elements, which are incorporated in the complete assembly of the casket truck hereinabout to be described in further detail, have been so conceived and so designed as to cooperate in attaining the above desired object.

To the accomplishment of the foregoing and related ends, said invention, then, consists of the means hereinafter fully described and particularly pointed out in the claim, the annexed drawing and the following description setting forth in detail certain mechanism embodying the invention, such disclosed means constituting, however, but one of various mechanical forms in which the principle of the invention may be used.

In said annexed drawing:—

Fig. 1 is a perspective view of the casket truck constructed according to the principle of my invention and showing said truck in extended operative position; Fig. 2 is a perspective view, similar to Fig. 1, but showing the truck in collapsed position; Fig. 3 is an enlarged, detailed sectional view of one of the rotatable supporting arms; Fig. 4 is an enlarged top plan view, with a portion thereof in section, of the combined carrying handle and folding brace juncture member; Fig. 5 is a fragmentary side elevational view of the lateral lazy-tong elements with the locking member in position thereon; Fig. 6 is an enlarged perspective view of the base casting member used in conjunction with the structure shown in Fig. 3; Fig. 7 is an enlarged perspective view of the lazy-tong limit lock; Fig. 8 is an enlarged sectional view taken substantially upon the line 8—8 of Fig. 5; and Fig. 9 is a section taken along the line 9—9 of Fig. 4.

Now, referring more particularly to the drawing, the truck assembly in general consists of the four vertical supporting posts 1, carrying upon their lower ends the forks 2 which in turn mount the rubber tired wheels 3. The vertical supporting posts 1, which are of a tubular nature, telescopically interfit with a second tubular member 4 which extends upwardly therefrom. The tubes 4 have connected thereto a band or collar 5 near their upper extremity, and the tubes 1 in turn have a similar band or collar 6 connected to their lower portion. The collars 5 and 6 serve as attachment means, to which the longitudinal and lateral collapsible lazy-tong elements 7 and 8 respectively are pivotally joined. It will thus be seen that inasmuch as the tubes 1 and 4 are adapted to telescopically move with respect to each other, the lazy-tong elements 7 and 8 will function as collapsible frame members in order that the truck assembly as a whole may be transformed at will into either of the positions shown in Figs. 1 and 2. In order to rigidly secure and maintain the casket truck in its extended position, there are provided the brace members 9 pivotally secured at their outer ends to each of the four vertical suporting posts 1. The braces 9 are joined at their central point of convergence or intersectional point to a combined carrying handle and juncture member 10. A more detailed description of the latter member is to follow presently.

For the purpose of providing an adjustable casket supporting means, a plurality of rotatable, horizontally extending arms are provided upon the uppermost ends of the posts 1. The arms 11, as best shown in Fig. 3, carry the resilient buttons 12, 12, which are secured thereto by suitable fastening screws 13. The arms 11 are in turn mounted upon a base member 14 and secured thereto by a central disposed stud 15 which possesses longitudinal movement by virtue of the provision of a coil spring 16. A projection 17 on the arm 11 fits into a complementary recess in the base member 14 and serves the purpose of centering the rim upon its base during rotation. A single lug 19 is also provided on the under side of the arm 11 and is adapted to interfit with a plurality of recesses 20, 21, 22, 23 and 24, in the upper edge of the base member. The last described elements in effect function as a detent for maintaining the rotational position of the arms 11. It is contemplated that the recesses 20 to 24, in the preferred structural embodiment, be five in number and disposed at positions corresponding to those occupied by the arms 11, as shown in Fig. 1, into positions at angles 90 degrees removed therefrom. The fifth position, as indicated by the recess 23, is at a 45 degree angle from the position of the arms 11, as indicated in Fig. 2, that is, a position diagonally toward the center of the truck. The latter position is for the purpose of accommodating the smaller size of caskets such as children's caskets. The position indicated in Fig. 1 is for the purpose of accommodating relatively long, large caskets. The position indicated by the dotted lines and referred to by numeral 11' in Fig. 1 is designed to accommodate large wide caskets, and of course the position indicated in Fig. 2 is best adapted for the folded or collapsed position of the truck assembly.

Now, referring to the construction of the combined carrying handle and horizontal brace juncture member 10, it is seen that the latter consists of a manual grasping portion 10, to which is joined the flared out or forked end portions 25 and 26. Each one of the braces 9, which incidentally should be of suitable strength and therefore are preferably made in angular cross-sectional form, are pivotally secured to the portions 25 and 26 by means of suitable fastener 27. In order to compensate for wear or a slight warping or misalignment of the braces 9, an adjusting screw 28, which is locked in position by the nut 29, is adapted to bear against the upper edge of the braces at a point removed from the pivot point 27. It will thus be seen that the braces 9, together with the member 10, are adapted to occupy either one of the positions as shown in Figs. 1 and 2. In the former position, these last nominated elements serve as a rigid horizontal truss between the four vertical supporting posts 1. In the collapsed position, as shown in Fig. 2, the elements 9 and 10 function as a convenient and well balanced carrying means. In the event that it is necessary to accommodate unusually small caskets and to shorten the length of the truck as a whole, a locking device 30 is attached to the lazy-tong elements 7 at their points of medial intersection.

The limit lock 30 consists of a central aperture 31, through which the stud 32 joining the lazy-tong elements 7 passes. The lock 30 is made longitudinally movable with respect to the stud 32 by virtue of the provision of compressible coil springs 33. A pair of V-shaped blocks 34 and 35 project from each end of the lock 30 and are adapted to serve as bearing surfaces against which the edges of the lazy-tong elements 7 abut. The angle of the V of the bearing surfaces of the projections 34 and 35 is made of such a degree as to prevent and limit the angular inclination of the lazy-tong elements with respect to each other. It will thus be seen from the immediate foregoing description that when the limit lock 30 is in operable position, the lazy-tong frame elements will be limited to a predetermined position of longitudinal extent, thereby shortening the length of the truck as a whole and enabling the latter to more conveniently accommodate smaller sized caskets. When it is desired to render the lock 30 inoperable, it is merely necessary to move the latter toward the head of the stud 32 to rotate it slightly so that the ends of the projections 34 and 35 bear against the face of the contiguous lazy-tong element. Such inoperative position is represented in Fig. 1.

The limit lock 30 is preferably positioned on the inner side of the lazy-tong elements 7 for the purpose of better concealing it from view. Although in practice it has been found that one of the locks 30 is satisfactory, nevertheless it is obvious that a plurality of them may be attached to more than one of the medial intersections of the lazy-tong elements 7. It should also be understood that when the lock 30 is used to limit the length of the lazy-tong elements 7, the braces 9 will not be able to occupy their fully extended horizontal position, but will take up a position angularly inclined from the horizontal due to the necessary decrease in length of the truck.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a casket truck, the combination of vertical supporting posts, rotatable horizontally extending arms on the upper ends of said posts, circular bearing faces on the inner ends of said arms, complementary bearing faces on the ends of said posts, spring pressure means urging said bearing faces into mutual contact, a projection on one of said bearing faces, and a plurality of recesses on the other of said bearing faces, said projection being adapted to engage any one of said recesses to retain said arms against rotation.

CARL BAUMGARDNER.